US006734783B1

(12) United States Patent
Anbai

(10) Patent No.: US 6,734,783 B1
(45) Date of Patent: May 11, 2004

(54) GATE MANAGEMENT SYSTEM

(75) Inventor: Noriyoshi Anbai, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 378 days.

(21) Appl. No.: 09/679,363

(22) Filed: Oct. 5, 2000

(30) Foreign Application Priority Data

Oct. 15, 1999 (JP) .......................................... 11-293254

(51) Int. Cl.[7] .................................................. H04Q 9/00

(52) U.S. Cl. .......................... 340/5.52; 70/337; 70/429; 109/56

(58) Field of Search ................................ 340/5.52, 5.7, 340/5.82

(56) References Cited

U.S. PATENT DOCUMENTS 5,949,882 A * 9/1999 Angelo ........................ 380/25
6,160,903 A * 12/2000 Hamid et al. ............... 382/115
6,219,439 B1 * 4/2001 Burger ....................... 382/115
6,272,562 B1 * 8/2001 Scott et al. .................. 710/16

* cited by examiner

*Primary Examiner*—Michael Horabik
*Assistant Examiner*—Matsuichiro Shimizu
(74) *Attorney, Agent, or Firm*—Junichi Mimura

(57) ABSTRACT

A gate management system for controlling an operation of a gate of a vault including a biometrics information management device having a first memory, storing biometrics information of at least a first and second persons, the first person being required to be accompanied with the second person to pass through the gate and the second person being able to pass the gate alone, a gate management device having a second memory, temporarily storing biometrics information of the first and second person in the second memory, and comparing the temporarily stored information with the information stored in the first memory, a controller controlling an operation of the gate based on a result of the comparison performed by the gate management device.

8 Claims, 5 Drawing Sheets

GATE MANAGEMENT SYSTEM

CROSS-REFERENCE TO RELATED APPLICATION

This application claims the priority benefit of Japanese Patent Application No. 11-293254, filed Oct. 15, 1999, the entire disclosure of which is incorporated herein of reference.

BACKGROUND OF THE INVENTION

1. Field of the Invention

The invention relates to a gate management system that uses a reliable identification, such as biometrics information, of a person who controls the system and a person who is authorized to use the system.

2. Description of the Related Art

Currently, many kinds of security systems are being used for identifying users of many devices and facilities. For example, in a security system at a bank, the following is used to prevent use by an unauthorized person. In view of the structural security, a safety-deposit box is placed in a vault, which has a gate. In view of the systematic security, after an identification of a prospective user of the box is checked, the user e.g. bank customer, can enter into the vault through the gate. Conventionally, the check of the identification is performed by using physical keys in the possession respectively of the user, and a bank manager who control the security system. That is, the gate has two key holes. One is for the key of a user, the other for the key of a bank manager. Only when each of the two keys corresponds to the corresponding key hole, can the gate of the vault be opened.

However, in the conventional security system described above, as the security check is performed by using physical keys, it also is possible for someone who is not an authorized user to open the gate if someone has somehow managed to obtain the key. Therefore, an improved security system that permit only an authorized user to pass through the gate is required.

SUMMARY OF THE INVENTION

An objective of the invention is to resolve the above-described problem and to provide a gate management system that uses a reliable identification, such as biometrics information, of a person who controls the system and a person who is authorized to use the system to access a gate of a vault.

The objective is achieved by a gate management system for controlling an operation of a gate of a vault including a biometrics information management device having a first memory, storing biometrics information of at least a first and second persons, the first person being required to be accompanied with the second person to pass through the gate and the second person being able to pass the gate alone, a gate management device having a second memory, temporarily storing biometrics information of the first and second person in the second memory, and comparing the temporarily stored information with the information stored in the first memory, a controller controlling an operation of the gate based on a result of the comparison performed by the gate management device.

BRIEF DESCRIPTION OF THE DRAWINGS

The invention will be more particularly described with reference to the accompanying drawings in which.

DETAILED DESCRIPTION OF THE PREFERRED EMBODIMENTS

In embodiments of the invention described below, the biometrics information used for identification is iris data. The iris is a thin film having a pupil at its center, which is located between the cornea and the crystalline lens. The iris controls the pupil to adjust the amount of light that enters an eye. Formation of the iris is completed during early childhood, and every iris has an unique pattern. Even between the irises of the same person, the pattern of the iris of the right eye is different from that of the left eye, and the pattern will never be changed during a person's life. Therefore, iris data is one of the most reliable biometrics information that person can possess for identifying a person.

Figure 1:
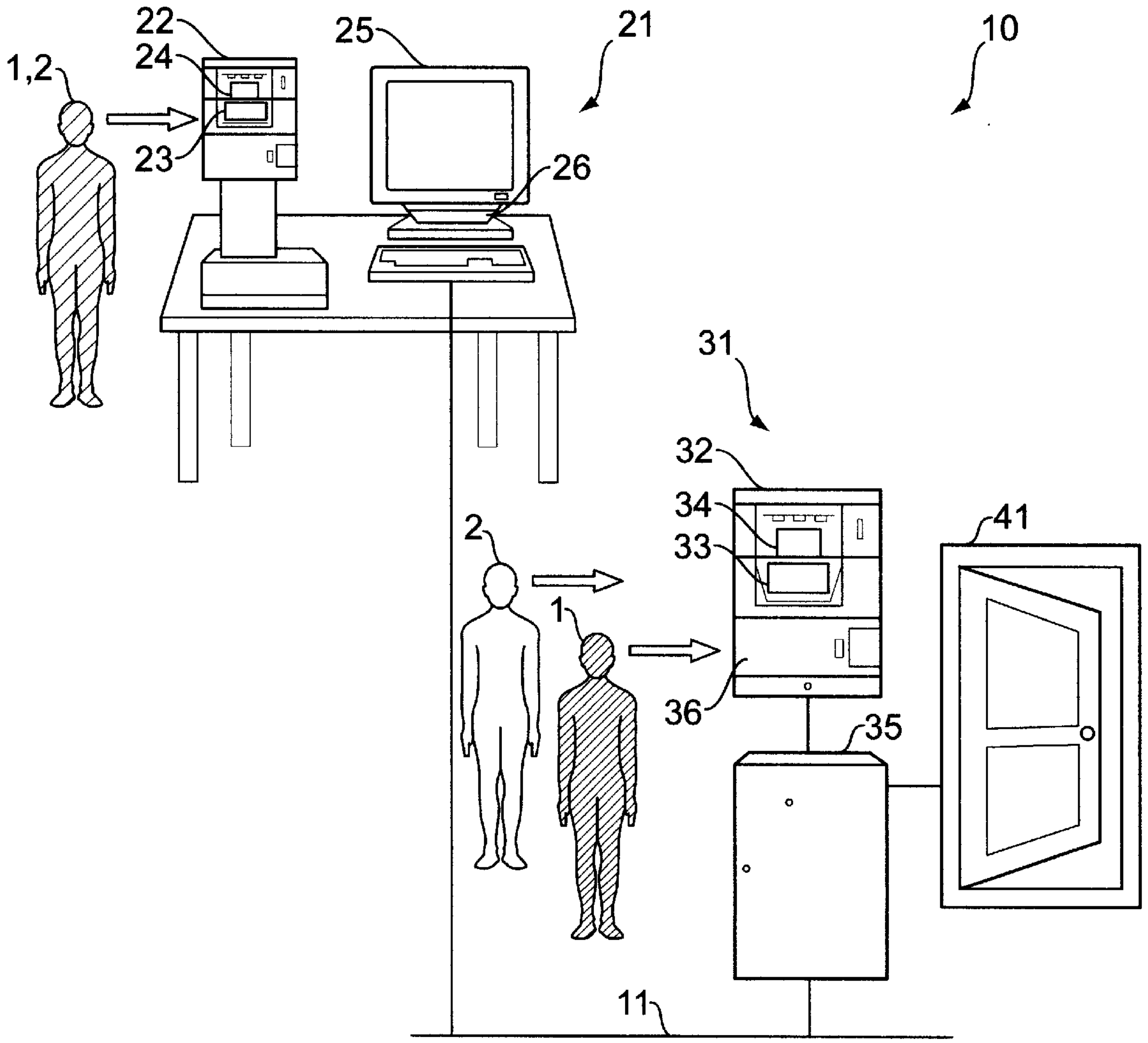
FIG. 1 is a perspective view of a total gate management system of a first embodiment of the invention.

Referring to FIG. 1, a gate management system 10 includes an iris management device 21, and a gate management device 31 that is connected to the iris management device 21 with LAN (Local Area Network) 11. The iris management device 21 includes a register 22 and a computer 25, which act as a registration means of the biometrics information of a user (e.g. customer) 1 who is allowed to pass through a gate 41 and of the bank employee 2 who controls the system. The register 22 controlled by the computer 25, includes a lighting element 23, such as a light emitting diode (LED) that output irradiates infrared radiation, and a camera 24 that captures an image of the iris pattern. The process for storing the iris data in the computer is explained below.

First, in the iris management device 21, the lighting element irradiates an eye with infrared light. Then, the image of the iris pattern is projected from eye and captured by the camera 24. Image data is transferred to the computer 25 where iris data is extracted and then, stored in the computer memory 26.

The gate management device 31 includes a recognition unit 32 and a controller 35 connected to the recognition unit 32. The recognition unit 32 includes a lighting element 33 similar to the lighting element 23 and a camera 34 similar to the camera 24. Like the register 22, the recognition unit 32 captures iris images of the user 1 and employee 2 and extracts iris data from the captured images. The extracted iris data is temporarily stored in a memory 36 in the collator 32, and is compared in the recognition unit 32 with the iris data stored in the computer memory 26. The controller 35 operates the gate 41 based on a result of the recognition process. That is, when it is found by the recognition unit 32 that the iris data of the user 1 and employee 2 stored in the computer memory 26 are identical to the iris data of the user 1 and employee 2 in the memory 26, the gate 41 is opened by instruction from the controller 35.

Figure 2:
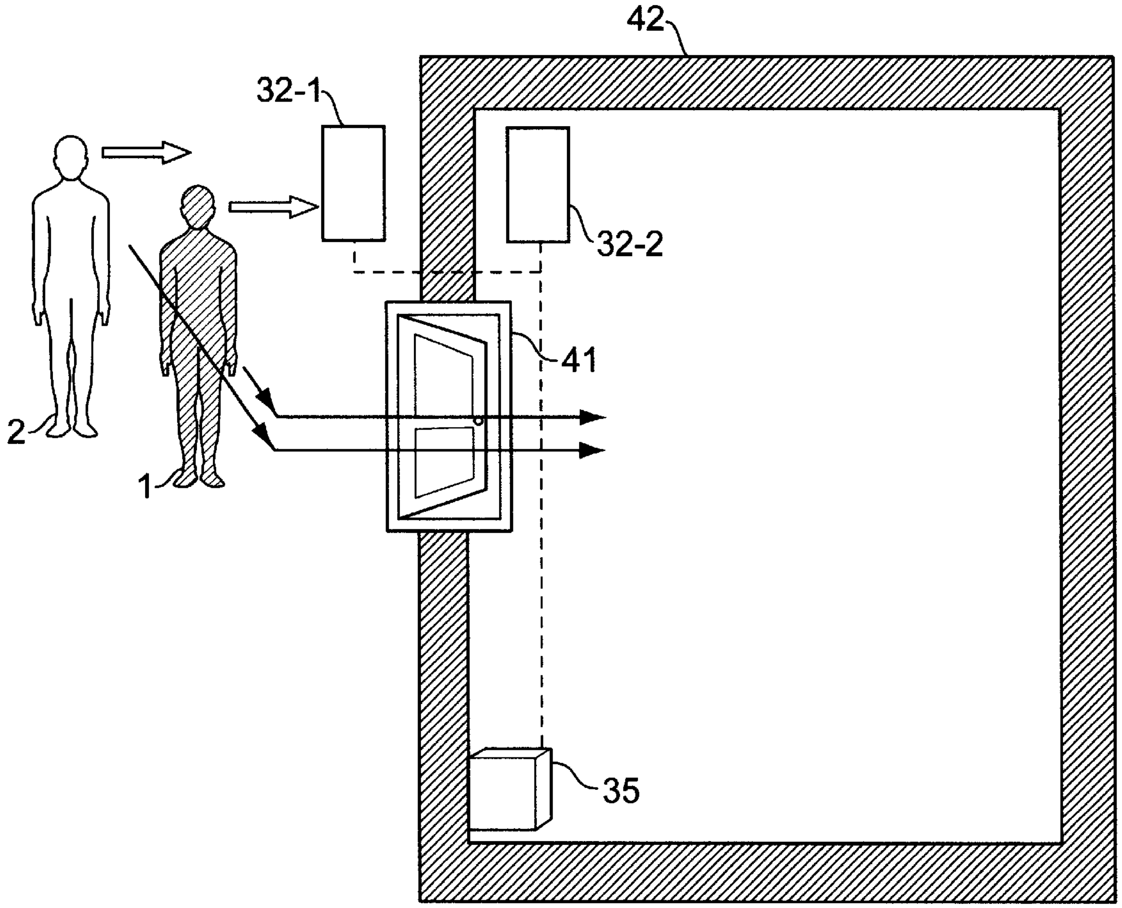
FIG. 2 is a perspective view of gate management system according to the first embodiment when a user enters a vault.

Referring to FIG. 2, an unillustrated safety-deposit box is placed in a closely managed vault 42. The controller 35 is placed in the vault 42 to prevent its unauthorized operation. The vault 42 has only one entrance gate 41. Two recognition units 32-1 and 32-2 can be used for the security reason. If two recognition units 32-1 and 32-2 are placed respectively outside and inside the vault 42, the identification check is performed again when the user 1 or the employee 2 gets out the vault 42. According to this procedure, it is possible to compare an entering record with an exiting record.

The operation of the gate management system is explained below with reference to FIGS. 3 and 4. First, the process of registering the iris data in the iris management device 21 is explained.

Figure 3:
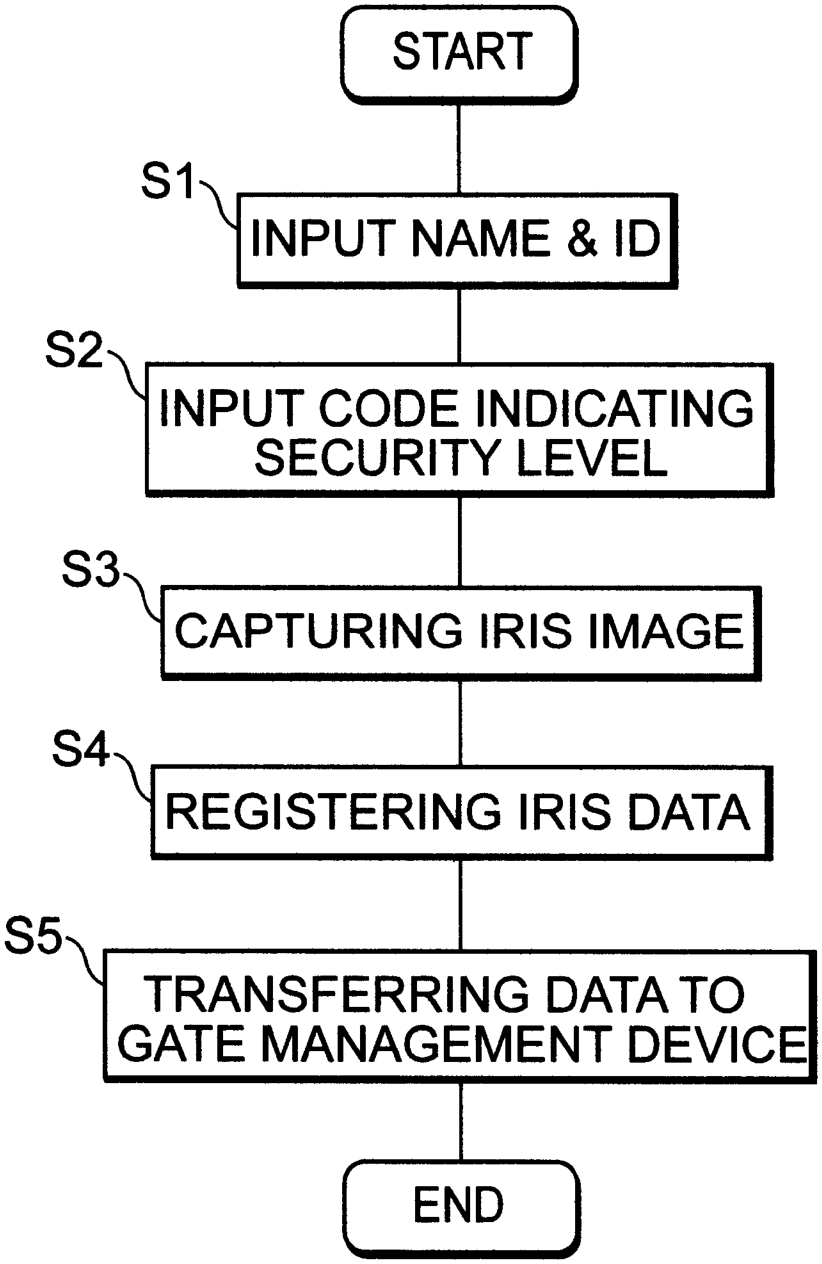
FIG. 3 is a flowchart showing how to register an iris of the user according to the first embodiment.
Figure 4:
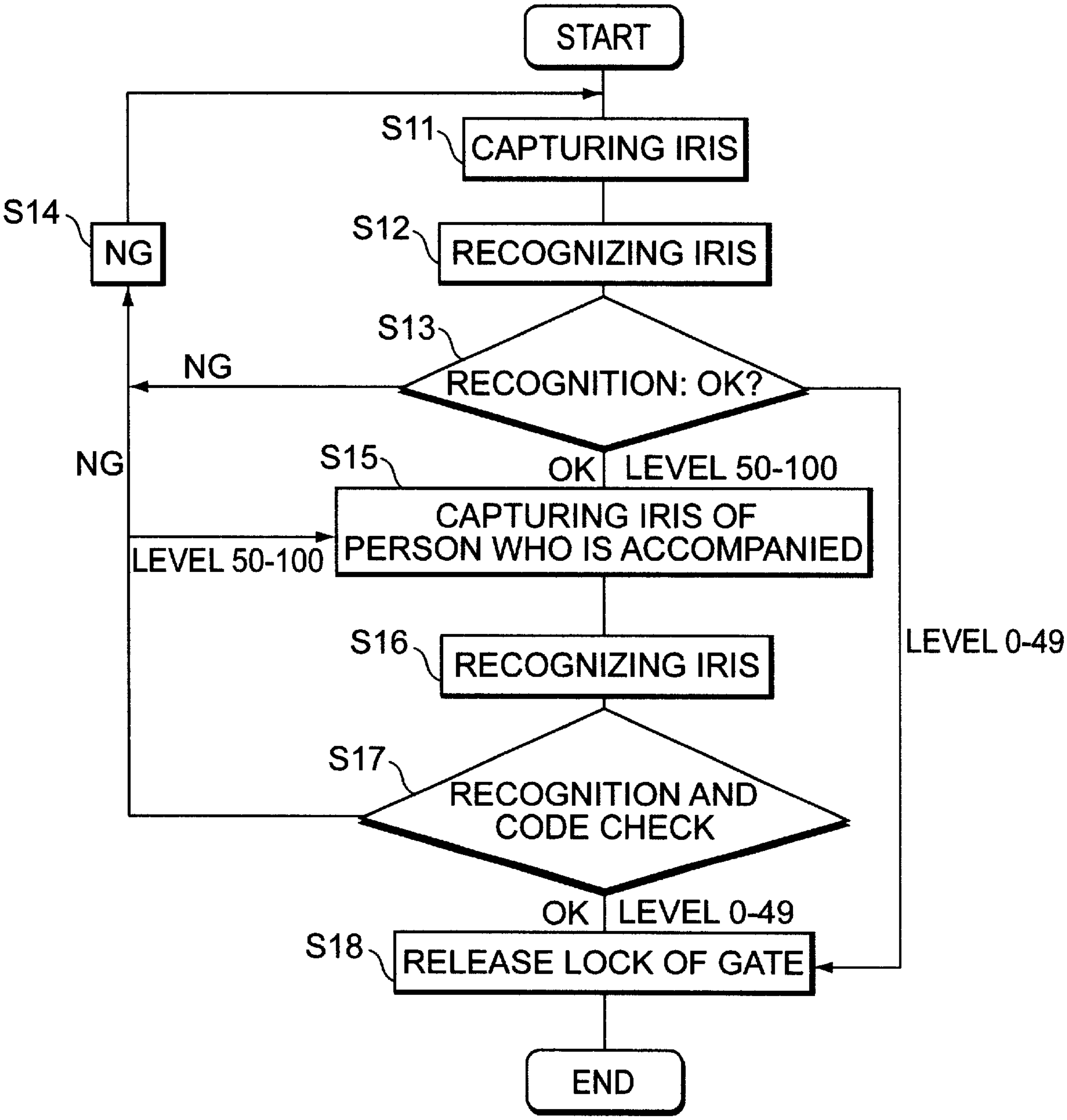
FIG. 4 is a flowchart showing how to authenticate the user according to the first embodiment.

Referring to FIG. 3, in step S1, the name and identification number of the user 1 and of the employee 2 are input to the computer 25.

Next, in step S2, data representing the security level of the user 1 and of the employee 2 are input to the computer 25. The security level indicates a rating liability of the people authorized to pass through the gate 42. For example, the security level can be set from 0 to 100, where the threshold security level unattended passage is 50. That is, the security levels 0 through 49 are applied to persons such as the employees, who have a high reliable status, and the security levels 50 through 100 are applied to persons, such as general users, whose passage must be attended by an employee, when passing through the gate 41. That is, a person having the security level of 50–100 is required to be accompanied by a person who having a security level of 0–49.

Next, in step S3, the iris pattern images of the user 1 and the employee 2 are captured by the method mentioned above. That is, the lighting element 23 of the register 22 irradiates an eye causing the image of the iris pattern to be projected from the eye and captured by the camera 24. The captured iris pattern image is transformed to about 256 bites of the iris data.

Next, in step S4, the iris data, the security level, the name and the identification, which are associated with the iris data, are registered in the computer.

In Step S5, the information registered in step S4 is transferred from the computer 25 to the gate management device 31 via the LAN 11.

Next, the gate accessing process performed by the gate management device 31 is explained with reference to FIG. 4. After the registration process has been completed, the user 1 or the employee 2 can pass through the gate 41 by the following steps.

First, in step S11, the iris pattern image of the user 1 or the employee 2 is captured by using the lighting element 33 and the camera 34 in the same way as in the registration process. Then, the captured image is transformed to iris data, and stored temporarily in the memory 36 of the recognition unit 32. If there are more than two users, iris data of all users should be stored in the memory 36.

Next, in step S12, a recognition process of the user 1 or the employee 2 is performed by comparing the iris data registered by the iris management device 21 with the iris data that is obtained in the step 11.

Next, in step S 13, if these iris data are not identical, steps S11 and S12 are repeated, as shown in step S 14. If these iris data are identical, then the security level of the iris data may be checked. In the case that these iris data are identical and the security level is under 49, the controller 35 recognizes that the employee 2 wants to pass through the gate 41. Therefore, the gate 41 is unlocked, and the employee 2 can enter the vault 42. If the security level is over 50, the controller 35 recognizes that the user 1 wants to pass through the gate 41, and is required to be accompanied with employee 2. Therefore, in steps S15–S17, information of an accompanying person is obtained.

In steps S15–S17, it is investigated to determine whether the accompanying person is another user or an employee. In step S15, an iris image of the accompanying person is captured, and then transformed into iris data in the same way as in step S11.

Next, in step S16, a recognition process is performed by comparing the iris data registered by the iris management device 21 with the iris data that is obtained in step 15.

In step S17, if these iris data are not identical, steps S11 through S16 are repeated. If these iris data are identical, the security level is then checked. If the security level is over 50, the controller 35 recognizes that the person is another user. Step 515 and step S16 are repeated until the controller 35 recognizes that the person is the employee. That the person is an employee is confirmed by a security level less than 49. In step S18, if the controller 35 recognizes that the person is the employee, the gate 41 is unlocked so that the employee and the user can enter the vault 42.

According to the first embodiment of the invention, the gate 41 is controlled by use of iris data, which is the most reliable means of identification to identify a person. Further, the operation of the gate is controlled by the combination of both the user's iris and the employee's iris. Therefore, as only an authorized user can open the gate with the assistance of the employee of the bank to enter the vault, the security system in the bank can be improved.

In the first embodiment, the iris management device 21 is physically separated from the gate management device 31 because the iris data of the user can be obtained anywhere. For example, an employee can bring the iris management device 21 to the user's home to register his/her iris data. However, since the gate management device 31 performs in the same way as the iris management device 21, these separate devices can be replaced by one device as an iris-gate management device.

Figure 5:
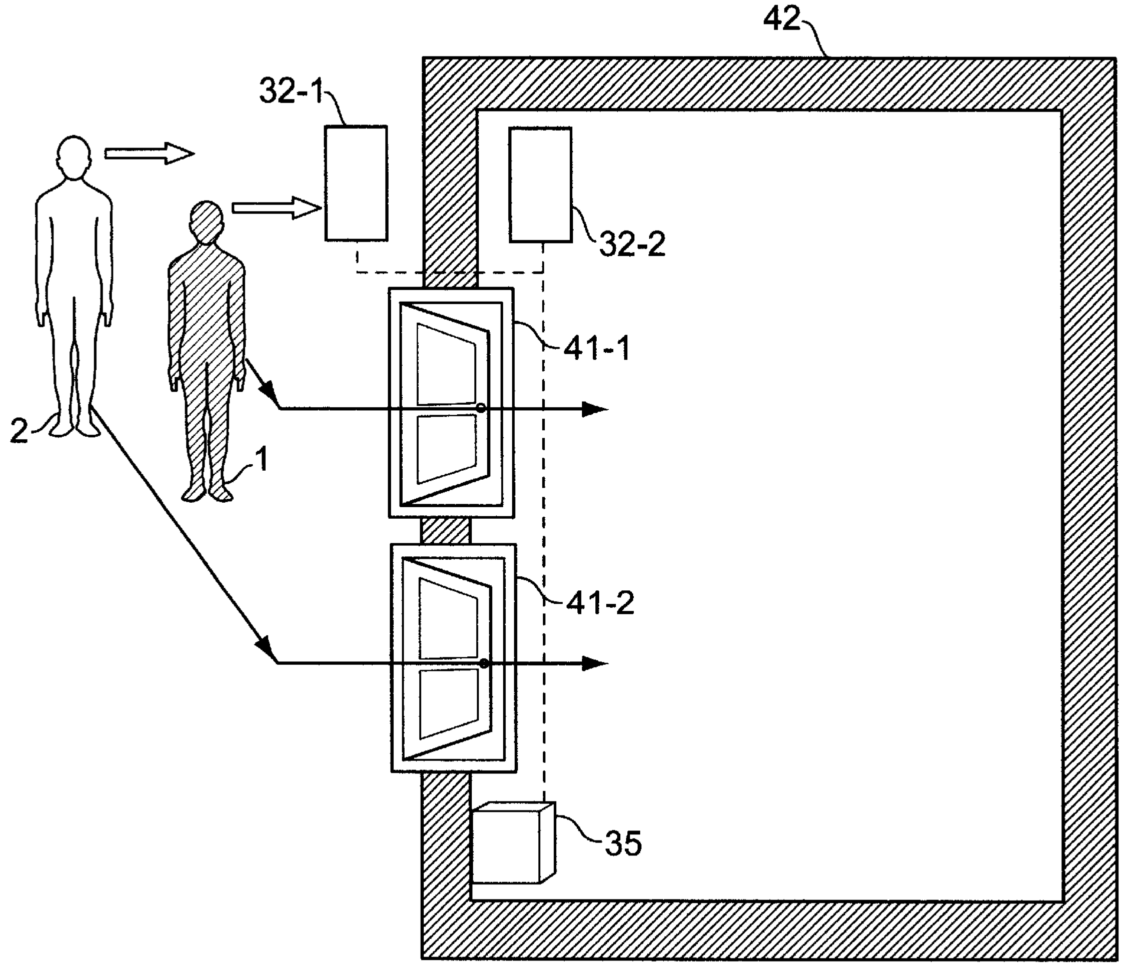
FIG. 5 is a prospective view of gate management system according to a second embodiment of the invention when a user enters a vault.

The second embodiment of the invention is explained with reference to FIG. 5. The second embodiment is useful when more than one user intends to enter a vault at the same time. In the second embodiment, a gate management system includes an iris management device and a gate management device, which are the same as these of the gate management system of the first embodiment. A vault 42 has two gates 41-1, 41-2 for the user 1 and the employee 2, respectively, to check people who intend to pass through the gate 41-1, 41-2 one-by-one. Because of its size, each gate allows only one person at a time to pass. The operation of the gate management system of the second embodiment is performed by the following steps.

First, the registration process for iris data and security levels of users 1 and employees 2 is performed in the same way described above with reference to FIG. 3 according to the first embodiment. Then, the recognition process and the security level check process are performed in the same way described above by performing steps S11 through S17 as illustrated in FIG. 4 according to the first embodiment. If it is confirmed that the registered iris data of the users 1 and the employee 2 and their temporarily stored iris data are identical, both gates 41-1, 41-2 are opened under instruction from the controller 35. Both of the gates 41-1, 41-2 will not open if either iris data of the users, which are registered and are temporarily stored, are not identical or iris data of the employee, which are registered and are temporarily stored, are not identical. After both gates 41-1, 41-2 are opened, the users can enter the vault 42 through the gate 41-1 and the employee can enter the vault42 through the gate 41-2. As described above, each gate 41-1, 41-2 allows only one person to pass. Therefore, the number of the person who can pass through the gate 41-1 is determined by the controller 35. If three people are allowed to pass through the gate 41-1, the gate 41-1 is closed after three people have passed through the gate 41-1. Therefore, an unauthorized person can not pass through the gate if he/she tried to pass through the gate together with the authorized user 1. When the employee 2 wants to enter the vault 42 alone without any users, he/she can pass through the gate 41-2 after the recognition process is completed because his/her security level is set under the 49. Of cause, in this situation, the gate 41-1 is not opened.

According to the second embodiment, since two gates 41-1, 41-2, each of which allow one person to pass, are provided, it is possible to prevent an unauthorized person from entering the vault, even if more than one user intends to enter the vault.

While the invention has been described with reference to illustrative embodiments, this description is not intended to be construed in a limiting sense. Various other modifications of the illustrated embodiments, as well as other embodiments of the invention, will be apparent to those skilled in the art on reference to this description. Therefore, the appended claims are intended cover any such modifications or embodiments as fall within the true scope of the invention.

What I claim is:

1. A gate management system for controlling an operation of a gate of a vault, comprising:

a biometrics information management device having a first memory, storing biometrics information of at least a first and second persons, the first person being required to be accompanied with the second person to pass through the gate and the second person being able to pass the gate alone;

a gate management device having a second memory, temporarily storing biometrics information of the first and second persons in the second memory, and comparing the temporarily stored information with the information stored in the first memory in order to operate the gate; and a controller controlling an operation of the gate based on a result of the comparison performed by the gate management device, wherein the biometrics information management device stores codes indicating security levels of the first and the second persons in the first memory, and the gate management device recognizes the security level of the first and second persons from the code, and wherein the codes are characterized in two groups, the second person is assigned to the first group and the first person is assigned to the second group.

2. A gate management system as claimed in claim 1, wherein for a plurality of first persons who intend to pass through the gate, the gate management device stores biometrics information of each of the first person in the second memory temporarily and compares the biometrics information for each of the first person stored in the second memory with corresponding information stored in the first memory.

3. A gate management system as claimed in claim 1, wherein the biometrics information is an iris pattern.

4. A gate management system as claimed in claim 2, wherein the biometrics information is an iris pattern.

5. A gate management system as claimed in claim 2, wherein the gate management device stores a code of each of the first person in the second memory temporarily and compares each biometrics information and the code for each of the first person stored in the second memory with corresponding information stored in the first memory.

6. A gate management system as claimed in claim 5, wherein the biometrics information is an iris pattern.

7. A gate management system as claimed in claim 1, wherein the gate includes a first gate for the first person and a second gate for the second person, and each of the first and second gates allows to pass one person only at once.

8. A gate management system as claimed in claim 7, wherein the controller opens the second gate only when the gate management device recognizes from the code that only the second person wants to pass the gate, and the controller opens the first and second gate when the gate management device recognizes from both codes that the first and second person want to pass the gate.

* * * * *